United States Patent [19]

Konotchick

[11] Patent Number: 5,347,186
[45] Date of Patent: Sep. 13, 1994

[54] LINEAR MOTION ELECTRIC POWER GENERATOR

[75] Inventor: John A. Konotchick, San Diego, Calif.

[73] Assignees: McQ Associates, Inc., Fredericksburg, Va.; KAB Laboratories Inc., San Diego, Calif.

[21] Appl. No.: 888,021

[22] Filed: May 26, 1992

[51] Int. Cl.$^5$ ............................................. H02K 35/02
[52] U.S. Cl. ............................................. 310/17; 322/3
[58] Field of Search ................ 310/14, 15, 17, 23, 310/24; 335/270, 274; 322/3

[56] References Cited

U.S. PATENT DOCUMENTS

| | | | |
|---|---|---|---|
| 4,239,974 | 12/1980 | Swander et al. | 290/1 R |
| 4,260,901 | 4/1981 | Woodbridge | 290/42 |
| 4,600,910 | 7/1986 | Vanderlaan | 335/229 |
| 4,697,113 | 9/1987 | Young | 310/15 |
| 4,754,157 | 6/1988 | Windle | 290/43 |
| 4,950,931 | 8/1990 | Golderberg et al. | 310/36 |
| 5,175,457 | 12/1992 | Vincent | 310/15 |

FOREIGN PATENT DOCUMENTS

8301158  3/1983  PCT Int'l Appl. .................. 290/1 R

Primary Examiner—Steven L. Stephan
Assistant Examiner—Judson H. Jones
Attorney, Agent, or Firm—John R. Ross

[57] ABSTRACT

A linear motion electric power generator. A rare earth magnet and a coil are positioned to move linearly back and forth relative to each other. The movement of the coil in the field of the magnet generates a current in the coil. Springless orientation means are provided to maintain a neutral position about which the relative motion occurs.

26 Claims, 8 Drawing Sheets

| SEA STATE | DESCRIPTION | BEAUFORT WIND FORCE | DESCRIPTION | WIND SPEED RANGE (KNOTS) | WAVE HEIGHT AVERAGE (FT) | AVERAGE PERIOD (SEC) | MINIMUM DURATION (HOURS) |
|---|---|---|---|---|---|---|---|
| 0 | LIKE A MIRROR | 0 | CALM | <1 | 0 | — | — |
| | RIPPLES | 1 | LIGHT AIRS | 1-3 | 0.05 | 0.5 | 0.3 |
| 1 | SMALL WAVELETS BUT DO NOT BREAK | 2 | LIGHT BREEZE | 4-6 | 0.2 | 1.4 | 0.8 |
| 2 | LARGE WAVELETS CRESTS BEGIN TO BREAK | 3 | GENTLE BREEZE | 7-10 | 0.6 | 2.4 | 1.7 |
| 3 | SMALL WAVES | 4 | MODERATE BREEZE | 11-16 | 1.8 | 3.8 | 4.8 |
| 4 | MODERATE WAVES CHANCE OF SPREY | 5 | FRESH BREEZE | 17-21 | 4.3 | 5.4 | 8.2 |
| 5 | LARGE WAVES WHITE FOAM CRESTS | 6 | STRONG BREEZE | 22-27 | 8.2 | 7.0 | 1.5 |

REF: DAVID TAYLOR MODEL BASIN, WILBUR MARKS

LINEAR MOTION ELECTRIC POWER GENERATOR

This invention relates to electric power generation.

BACKGROUND OF THE INVENTION

There are many electrical devices such as environmental monitors and alarms which are installed at remote locations where they cannot, in many cases, be conveniently wired to electrical power lines. Batteries have limited lives and solar cells are expensive and don't work when the sun doesn't shine. Many remote applications, such as ocean surfaces or remote roadways, have available considerable mechanical energy that is not being used. That mechanical energy is normally in the form of essentially linear, bi-directional motion.

Almost all electrical power produced in the world is generated from large rotary generators. Some attempts have been made to convert linear mechanical energy into electricity. U.S. Pat. No. 4,239,974 would attempt to convert vehicular roadway traffic energy into electrical power by using a plurality of magnets and coils. This device, however, was impractical requiring extensive installation cost, and would have been very inefficient, wasting most of the available mechanical energy in compression springs.

Another U.S. Pat. No. 4,260,901 attempted to convert the linear rise and fall of sea waves into electrical power. This device required complex mechanical linkages, and also converted the linear motion into rotary motion to generate its power.

Powerful rare earth magnets (for example Samarium-Cobalt, and Neodymium-Iron-Boron magnets) have been available for years.

SUMMARY OF THE INVENTION

The present invention provides a linear motion electric power generator. A rare earth magnet and a coil are positioned to move linearly back and forth relative to each other. The movement of the coil in the field of the magnet generates a current in the coil. Springless orientation means are provided to maintain a neutral position about which the relative motion occurs.

DETAILED DESCRIPTION OF PREFERRED EMBODIMENTS

Concept and Laboratory Demonstration Models

To demonstrate the basic concept of the present invention, I constructed a variety of laboratory demonstration models. FIGS 1, 2, 3A, 3B, 4, 5A, and 5B illustrate these basic embodiments. Four basic types of power units were constructed, a "unidirectional force" unit, a "back and forth" unit, a "confined vibratory" unit, and a "battery replacement" unit. Each has particular operating characteristics, and applications, so will be discussed individually. Each device derives its power from bi-directional linear, or essentially linear, motion of a rare earth magnet relative to a coil and each provides a springless method of maintaining a neutral position about which the bi-directional motion takes place.

Uni-Directional Force Power Generator Model

Concept

Figure 1:
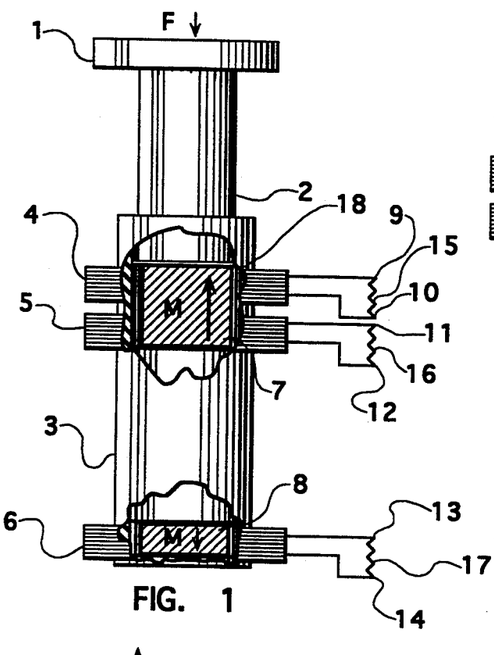
FIG. 1 is an illustration of the "uni-directional force" power generator.

FIG. 1 shows a representation of a linear, bi-directional power generator driven by a uni-directional force. This unit generates electrical energy whenever the platform 1 is moved up or down. Referring to FIG. 1, when a force is applied to platform 1 it will move, (for example, by stepping on it, placing an object on it), that resulting motion will be transferred to magnet 7 via cylinder 2. Magnet 7 is free to slide within tubular cylinder 3. Tubular cylinder 3 is surrounded by coils of wire 4 and 5. The fixed magnet 8 is oriented as to oppose magnet 7, causing magnet 7 to "float" in equilibrium when no force is applied to platform 1. Magnet 8 has a coil of wire 6 wrapped around it. When magnet 7 is moved toward or away from magnet 8, a voltage will be created in coil 6 due to a change in magnet flux flowing through coil 6. As magnet 7 moves through cylinder 3, and therefore through coils 4 and 5, it will also change the magnet flux flowing through those coils, producing a voltage in each of them. This device will generate voltages in coils 4, 5, and 6 whenever magnet 7 is moved up or down. Magnet 7 will move up or down whenever a force is applied to platform 1. A retaining ring 18 or tab is used at the lower end of cylinder 2 to prevent cylinder 2 from exiting tubular cylinder 3. The voltage output from coils 4, 5, and 6 are taken across load resistors 15, 16, and 17 respectively.

Prototype

One prototype of this model was built using a 1 foot long section of 1½ inch PVC pipe for cylinder 3. It had an inside diameter of 1.59 inches, and an outside diameter of 1.92 inches. Coil 4 was 2500 turns of #30 magnet wire with a resistance of 151 ohms, a thickness of about 0.25 inches, and a length of about 2 inches. Coil 5 was 8500 turns of #38 magnet wire with a resistance of 3,150 ohms, a thickness of about 0.25 inches, and a length of about 2 inches. Rare earth magnet 7 was made of neodymium-iron-boron, and had a diameter of about 1 inch, and a thickness of about ⅜ inches. To prevent it from turning within cylindrical tube 3, fender washers with an outside diameter of 1.51 inches were attached on both ends of magnet 7. Tubular cylinder 2 and platform 1 were made from a 1 inch diameter wooden dowel rod with a fender washer attached to the lower end with a screw in the axial center of the dowel rod. Its length was approximately 1 foot long. Magnet 8 was identical to magnet 7, except it was oriented as to oppose the magnetic field of magnet 7. This caused magnet 7 to "float" within coils 4 and 5.

The wires from coils 4 and 5 were attached to terminal posts where load resistor 15 of 150 ohms was connected across coil 4, and load resistor 16 of 3300 ohms was connected across coil 5. Oscilloscope leads were then connected across each load resistor, at points 9, 10, 11, and 12 to measure the voltage produced on each resistor. The voltage produced was essentially sinusoidal when the device was moved up and down in a shaking motion. With impulsive force applied to platform 1, over 1 watt of peak power was generated from each coil.

Coil 6 was not wrapped around magnet 8 in the prototype model, but was tested separately in another model. Coil 6 was wound around a surplus $N_dF_eB$ magnet 8. For this test, magnet 8 was approximately 2 inches in diameter and ⅜ inches thick. Coil 6 was 1000 turns of #38 magnet wire, it had a thickness of about 1/16 inches, and measured 395 ohms. Using load resistor 17 of 390 ohms across the coil, the voltage was measured as an identical magnet in polar opposition was moved toward the first magnet. This very small coil still generated about 6.4 milliwatts peak power, for moderate movements.

Back and Forth Power Generator Model

Figure 2:
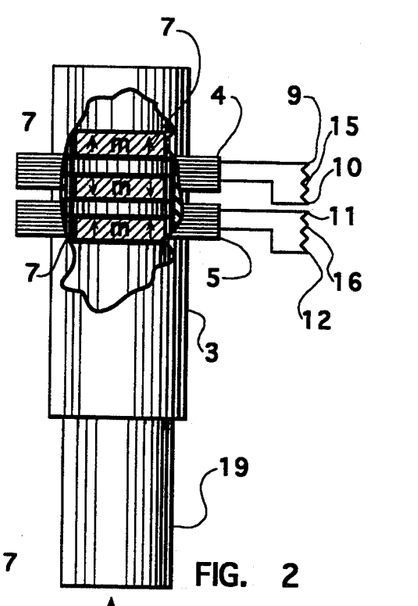
FIG. 2 is an illustration of the "back-and-forth" power generator.

To test a special case application for buoy use which will be described later, a linear back and forth motion configuration was tested. FIG. 2 shows this test unit. This unit used the same tube 3, and coils 4, 5 of FIG. 1. It used three identical magnets 7 in polar opposition inside tube 3. A wooden dowel rod 19 was used to move the magnets up and down through tube 3. Voltages were monitored across the 150 ohm and 3300 ohm load resistors 15 and 16 as the wooden dowel rod 19 was used to simulate expected motion produced by a spar buoy in ocean conditions. This modest configuration would generate typically about 0.25 watts of power in each coil, but with vigorous wave simulation would generate over 1 watt of power from each coil.

Confined Vibratory Power Generator Model

Concept

Figure 3A:
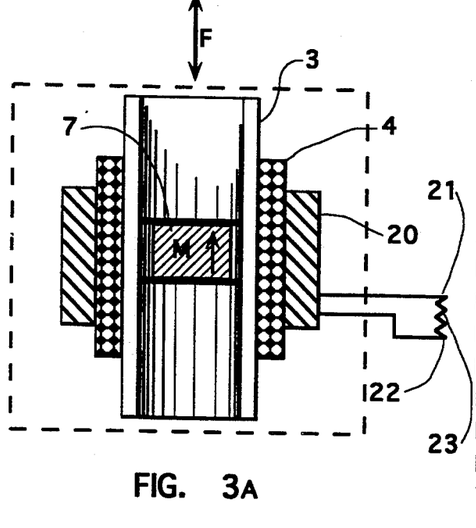
FIG. 3A is an illustration of one embodiment of the "confined vibratory" power generator.
Figure 3B:
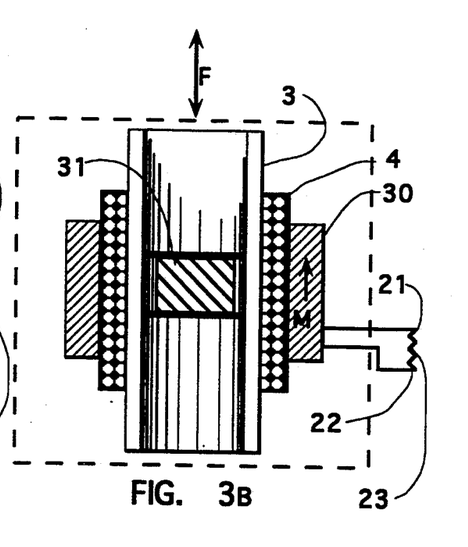
FIG. 3B is an illustration of another embodiment of the "confined vibratory" power generator.

For applications where vibratory mechanical energy is available, vibratory power generator models shown in FIGS. 3A and 3B were tested. Each of these models show the use of only one magnet and one coil, but multiple numbers of each could be used. FIG. 3A contains a cylindrical, non-ferrous, ideally non-conductive tube 3, cylindrical magnet 7, wire coil 4, and ferrous cylindrical ring 20. The ferrous ring 20 creates a low reluctance path for the flux developed by permanent magnet 7. This will cause the magnet to be suspended in equilibrium within the coil when the unit is stationary. When any vibration causes the unit to move up or down, the inertia of magnet 7 will cause it to move relative to coil 4, creating a change in the flux passing through coil 4. This will create a voltage in coil 4.

Prototype

The test model used a thin cylindrical, brass tube, six inches long and 9/16 inches in diameter for tube 3. Coil 4 was 850 turns of #30 magnet wire, and had a length of 0.275 inches, an O.D. of 1.535 inches, and an I.D. of 0.565 inches; its resistance was about 25 ohms. Magnet 7 was a cylindrical $N_dF_eB$ magnet of 0.5 inch diameter and 0.25 inch thickness, obtainable from Magnet Sales and Manufacturing, in CA. Ferrous ring 20 was a steel washer with an I.D. of 9/16 inches which was slid on tube 3 up against coil 4. Although, this model did not use ferrous cylinder ring 20 directly outside coil 4, but adjacent to it, the effect was similar and demonstrated the principle of the embodiment. The dropped magnet 7 would come to equilibrium inside ferrous ring 20. Shaking the unit would generate power. Coil 4 was connected to a 20 ohm load resistor 23 and points 21 and 22 were monitored on an oscilloscope. This model generated about 50 milliwatts of peak power across a 20 ohm load resistor.

Concept

FIG. 3B illustrates another embodiment of a vibratory power generator. This embodiment differs from FIG. 3A in that the magnet is now on the outside of the coil 4, and the ferrous metal 31 is on the inside of the cylindrical tube 3. As the unit is moved up or down, the inertia of ferrous cylindrical slug 31 will move within tube 3 and within coil 4. This will create a change in flux flowing through coil 4, and hence will generate an electrical voltage. Toroidal magnet 30 supplies the flux and the restoring force to keep ferrous slug 31 in equilibrium within the coil.

Prototype

A miniature model of this embodiment was built using a 3 inch long section of rectangular brass tube with an outside square dimension of 0.193 inches, and an inside square dimension of 0.160 inches, for tube 3. Coil 4 was 275 turns of #36 magnet wire, with a length of 0.75 inches and a resistance of 2.5 ohms. Magnet 30 was two toroidal, ceramic magnets, each with a thickness of 0.25 inches, an O.D. of 1.125 inches, and an I.D. of 0.375 inches. The ferrous slug 31 was a rectangular ferrite rod 1 inch long and 0.135 inch square. When dropped into the brass tube 3, ferrite rod 31 would come to equilibrium in the center of coil 4 and magnet 30. Coil 4 was connected to a 4.7 ohm load resistor 23 and points 21 and 22 were monitored on an oscilloscope. Shaking the unit up and down would generate an essentially sinusoidal voltage across a load resistor in parallel with coil 4. This miniature model generated about 100 microwatts of peak power.

In tests, both the designs of FIG. 3A and of FIG. 3B generated essentially sinusoidal signals with slight shaking of the units up and down.

Battery Replacement Model

Figure 4:
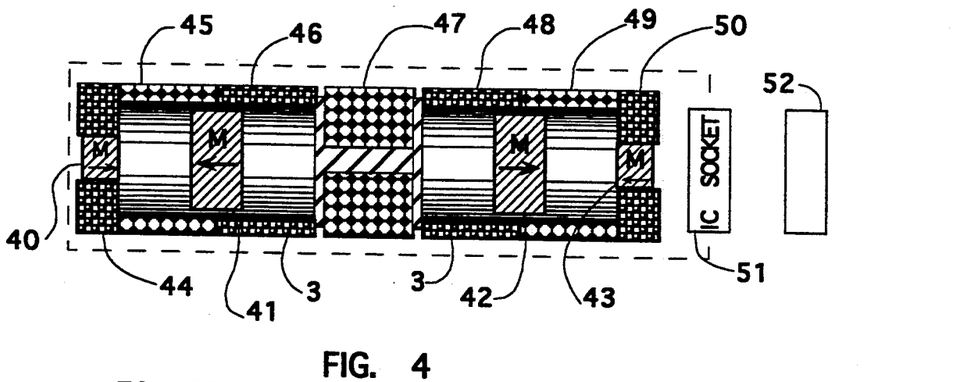
FIG. 4 is an illustration of the prototype "battery replacement" power generator.

For this model the power generator device was configured to approximately the same size as the respective battery size it might replace. An experimental prototype design for a "double-D" size configuration was built and tested. FIG. 4 illustrates this first prototype model. It contained four magnets 40, 41, 42, and 43 all aligned in polar opposition, and spaced so as to permit magnets 41 and 42 to essentially "float" in equilibrium inside cylindrical tube 3. Seven coils 44, 45, 46, 47, 48, 49, and 50 are used to generate voltages when the unit is shaken. Moving the unit causes magnets 41 and 42 to move, which in turn generates flux changes, and hence voltage changes in all coils.

In this model, magnets 41 and 42 were 1 inch diameter by 0.5 inch thick cylindrical $N_dF_eB$ rare earth magnets. Magnets 40 and 43 are 0.5 inch diameter by 0.2 inch thick $N_dF_eB$ rare earth magnets. Both are obtainable from Magnets Sales and Manufacturing, Inc. in California. A coating of about 1/16 inch thickness of fibre glass casting resin was applied to magnets 41 and 42 to both build up their diameter, to fit tube 3 better, and also to prevent oxidation of the magnets. Coils 44 and 50 were constructed of 4000 turns of #38 wire, and had a resistance of 750 ohms. Coil 47 was constructed of 20,000 turns of #38 wire with a resistance of 2,525 ohms. Coils 45, 46, 48, and 49 were constructed of 3500 turns of #38 wire with a resistance of 650 ohms. Cylindrical tube 3 was constructed of thin plastic sheeting heat-formed on a dowel of similar diameter. All seven coils were brought out to an eight pin integrated circuit socket 51, with one side of each connected to one "common" pin, and the other seven wires connected to each of the other seven pins. A similar socket 52 mounted into the first, and was connected to an eight conductor cable. The entire unit was coated with fibre glass casting resin to protect the coil wires, and to bind the unit into a solid, durable device.

Using a test cable with connector 52 attached, I connected a load to the unit through connector 51. The test cable terminated each respective coil with a resistance approximately equal to the coil's resistance. These load resistances were 750 ohms for coils 44, and 50; 680 ohms for coils 45, 46, 48, and 49; and 2500 ohms for coil 47. The output voltage of each coil was monitored by attaching an oscilloscope across the load resistors, and these voltages were photographed as the unit was moderately shaken. The results of this test showed that this unit provides 94 milliwatts of peak power in each of coils 45, 46, 48, and 49. Coil 47 provided 10 milliwatts peak power. Coils 44 and 50 provided 85 milliwatts peak power in each. These seven coils therefore provided a total peak power of 456 milliwatts of peak power, or about ¼ watt of continuous RMS power. The unit, however, was not of optimum design. For example, coil 47 adds little power contribution, coils 45, 46, 48, and 49 should have been larger, and magnets 41 and 42 should have been thicker.

Figure 5A:
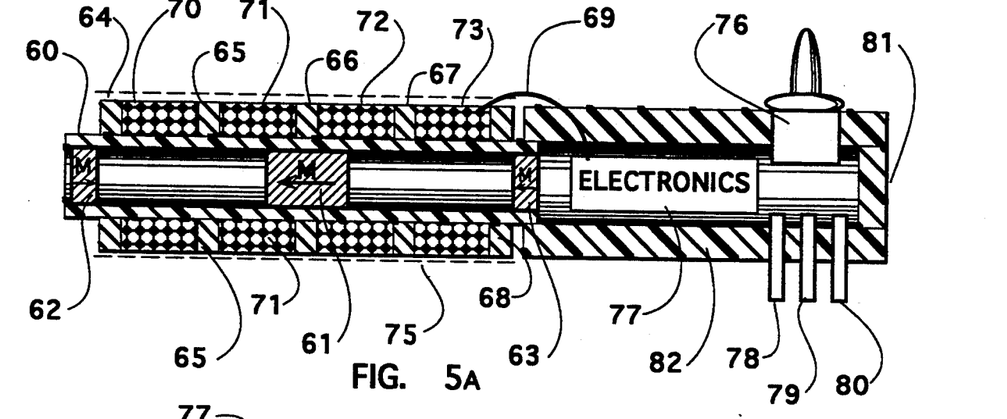
FIG. 5A is an illustration of an embodiment of a combined "battery-replacement/battery charger" demonstration unit.

A second model of the "battery replacement" embodiment was built in a combined battery charger/battery replacement model to test other parameters, such as shielding, and output electronics. This model is illustrated in FIG. 5A. It was completely self-contained, and used switch 76 to select a battery charging mode, or a capacitor energy storage mode.

Clear acrylic plastic tubing 60 with an I.D. of 0.5 inch and an O.D. of 0.625 inch was used to house magnets 61, 62, and 63. Coils 70, 71, 72, and 73 were wound on the tube using 0.25 inch long spacers 64, 65, 66, 67, and 68 which were cut from clear acrylic tubing with an I.D. of 0.625 inch and an O.D. of 0.875 inch. The coils had a thickness of about 0.125 inch and a length of about 0.75 inch. Each coil was wound of 5,000 turns of #38 magnet wire and had a resistance of about 680 ohms. Magnets 62 and 63 were 0.5 inch diameter by 0.25 inch long, and were fixed permanently to tube 60 using acetone. Magnet 61 was 0.5 inch diameter, teflon coated, and 0.59 inches long. All magnets were of $N_dF_eB$ and are obtainable from Magnet Sales and Manufacturing Inc., of California.

A shield 75 of several turns of 0.004 inch thickness high permeability foil (from M$\mu$Shield Company, Inc., Goffstown, N.H.) was also wrapped around the completed power generator unit. This shield provides an important addition to the unit, by both reducing the magnetic field effects from outside elements, and by increasing power output. The shield keeps the magnets from attracting high permeable materials in the vicinity of the device. If they did, magnet 61 would not be "free-floating" any more. The strong magnetic field from magnets 61, 62, and 63 are also contained so that they do not interfere with other nearby devices, e.g., CRTs, magnetic cards, floppy diskettes, etc. The other major contribution of the shield is to increase power efficiency by pulling more of the magnetic flux through coils 70, 71, 72, and 73. In this unit power output went up about 20 percent, but in other models built the addition of the shield increased power output by as much as 100 percent. Coil wires 69 were brought into another part of the unit comprising the electronics 77, a toggle switch 76, and electrical contacts 78, 79, and 80. This part of the unit was comprised of a section of the same tubing used to construct spacers 64–68. A plug of acrylic rod stock 81 was used to seal the unit.

The power generation part of this model had an outside diameter of about 1 inch and a length of about 5 inches. The electronics comprised another 4 inches. The total weight of the entire unit was about 7.8 oz, about one-half of which was the electronics.

With moderate shaking it would maintain a constant DC voltage of 4 volts across a parallel combination of 300 ohm resistor and 1000 microfarad capacitor. Shaking the unit in any orientation would deliver in excess of 50 milliwatts of continuous power. Hard shaking could maintain over 80 milliwatts of continuous power.

Figure 5B:
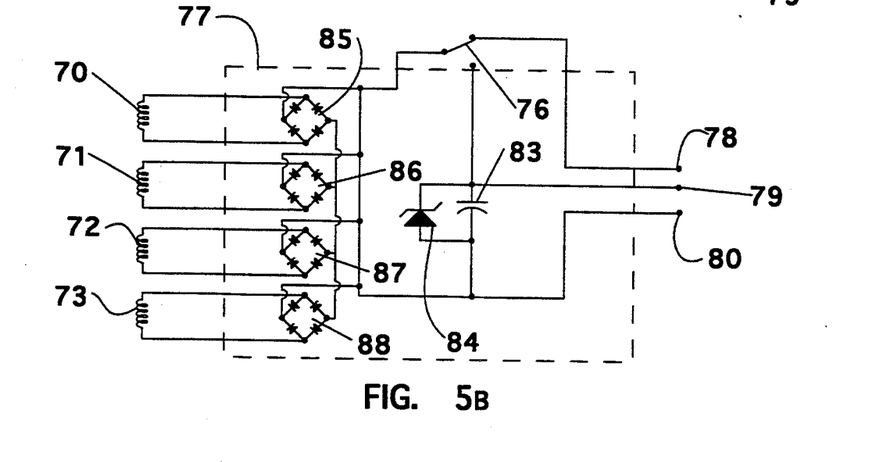
FIG. 5B is an electrical schematic showing the electronics used in FIG. 5A.

FIG. 5B illustrates the electronics used in the FIG. 5A demonstration model. Switch 76 permits an output to battery charging mode terminal 78, or to battery replacement mode terminal 79. Terminal 80 is the common connection for both. The electronics 77 are all contained within acrylic tube 82. They include four bridge rectifiers 85, 86, 87, and 88. To provide some DC smoothing in the battery replacement mode, capacitor 83 is added. It has a value of 1000 microfarads. A 5.1 volt zener diode 84 was added to provide over-voltage protection.

To gain some indication of mechanical-to-electrical conversion, I tried a couple simple drop tests. A 0.5 inch drop (on an end) would give a peak power impulse of about 80 milliwatts. A 1.0 inch drop (on an end) would give a peak impulse power of 119 milliwatts. Oscilloscope photographs were taken of the voltage waveforms produced from these drop tests, and the area under the curves integrated. The ½ inch and 1 inch drop produced electrical energies of 1.8 millijoules and 2.38 millijoules respectively. The weight of the total unit was 7.9 oz. The mechanical energy of each drop was therefore 37 millijoules and 75 millijoules respectively. The resulting efficiency of the ½ inch drop conversion was about 4.8% and the 1 inch drop was about 2.7%. This conversion, however, was based upon the extra weight of the assorted electronics demonstration circuitry. If we just used the 0.5 oz. weight of magnet 61 used to produce the electrical power the power conversion efficiency would be 57%. This is an upper bound. A practical achievable conversion efficiency would probably lie between 25% and 40%.

PREFERRED APPLICATIONS OF INVENTION

Buoy Generator Configurations

Figures 6, 7, 13:
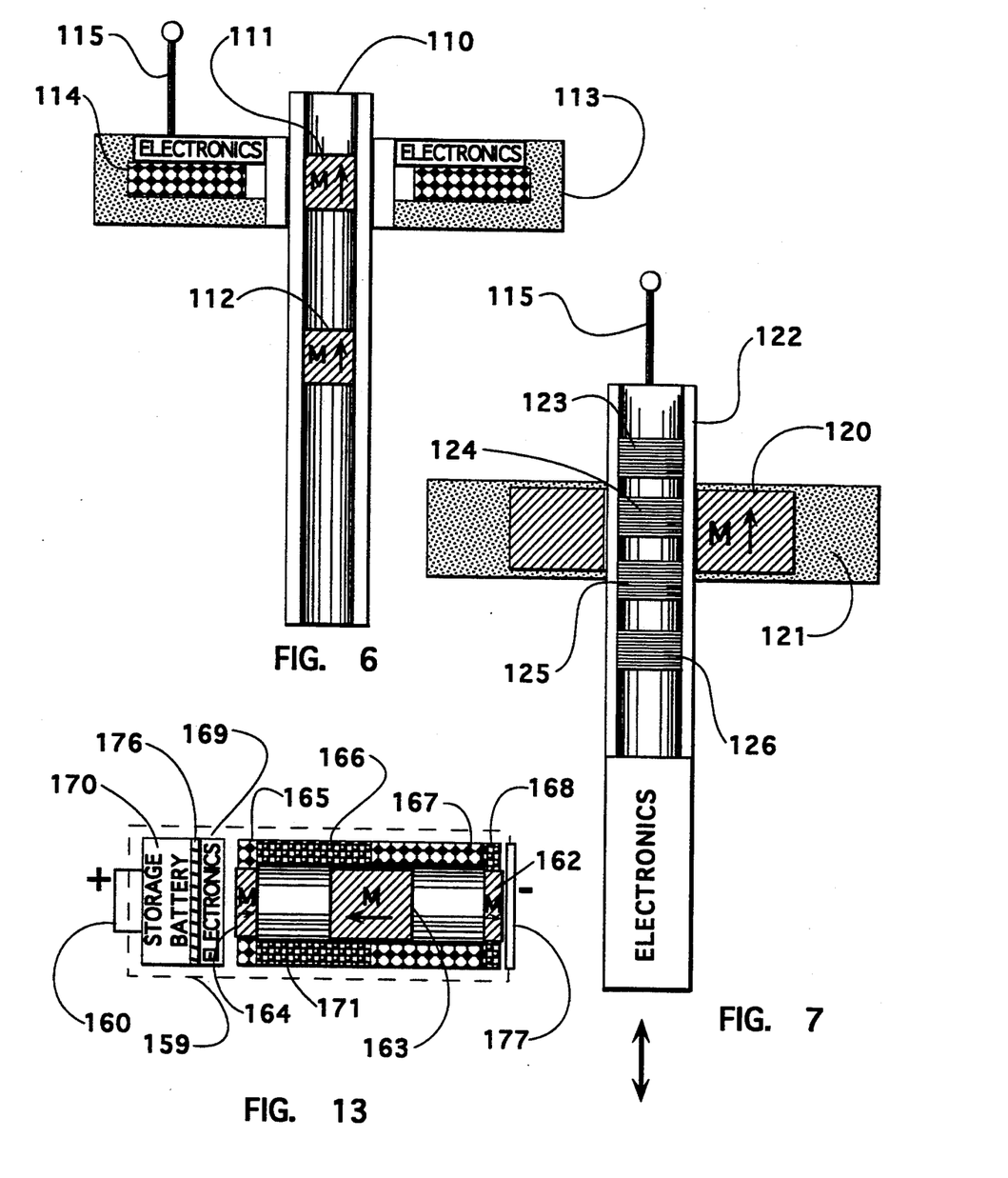
FIG. 6 shows one embodiment of the spar buoy power generator.
FIG. 7 shows another embodiment of the spar buoy power generator.
FIG. 13 illustrates a battery-replacement embodiment.

One useful application for this invention is in coupling the mechanical energy of ocean waves into useful electrical power for use in extended seaborne applications. In this application, the back and forth power generators could be used. FIG. 6 shows one embodiment of a spar buoy power generator. In this configuration cylindrical spar 110 contains fixed magnets 111 and 112. Spar 110 is free to move within a floatation ring 113 which contains at least one cylindrical coil 114. The size, density, and shade of the spar buoy elements 110 and 113 determine the motion of spar 110 with respect to floatation ring 113. As spar 110 moves back and forth through floatation ring 113, it moves magnets 111 and 112 back and forth through coil 114. This movement creates a voltage in coil 114. That voltage can be then be rectified and used to power devices, or stored on capacitors or batteries.

FIG. 7 shows another spar buoy embodiment. This embodiment uses a toroidal magnet 120 attached to floatation ring 121, and fixed coils 123, 124, 125, and 126 within spar 122. As spar 122 moves up and down through floatation ring 121, the magnetic flux through coils 123, 124, 125, and 126 will vary. This change in flux will create a voltage in these coils which can be rectified and used to power a variety of devices. These devices would typically include electronics for processing and RF transmission through an antenna 115.

Figure 8:
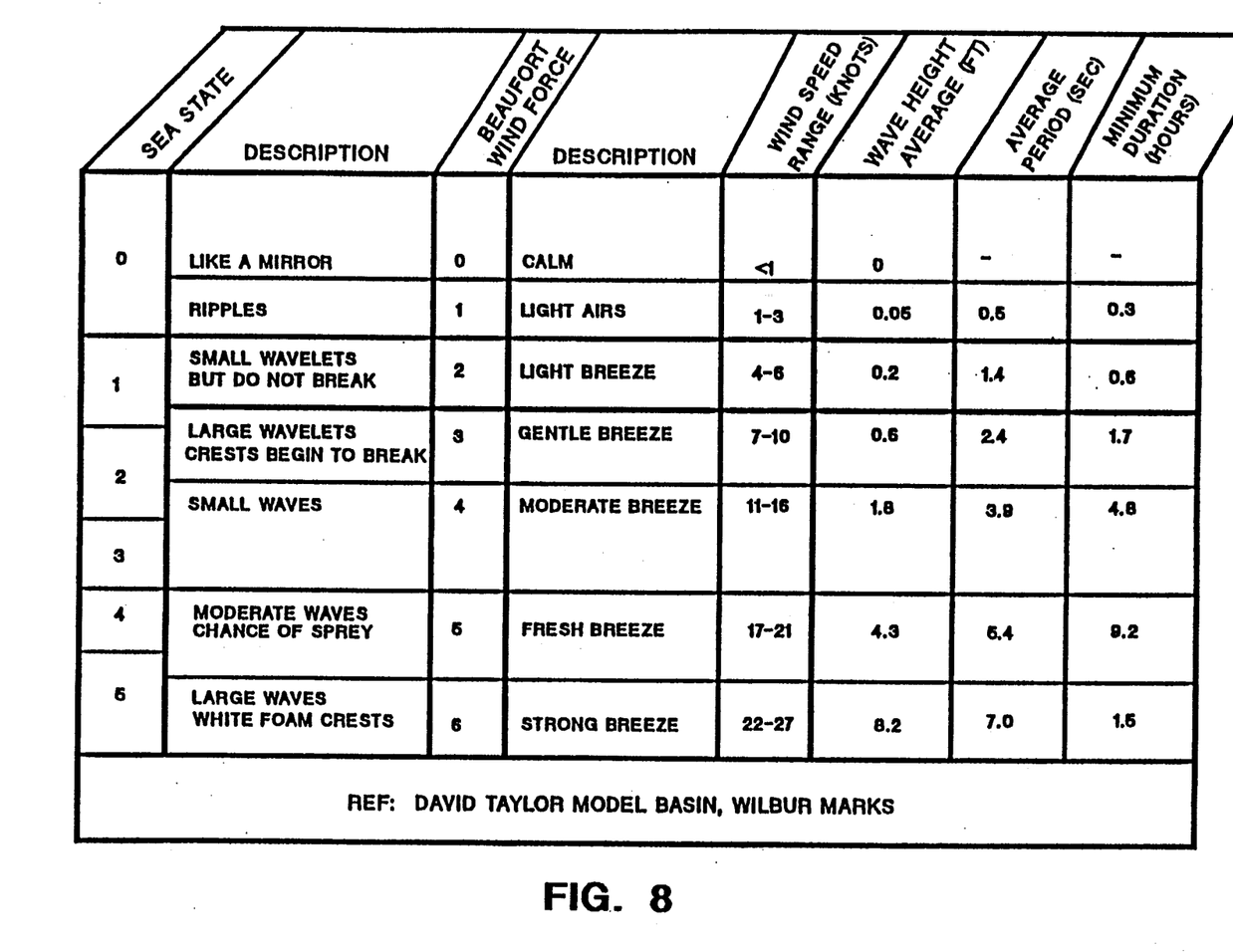
FIG. 8 is a chart showing the mechanical characteristics of typical ocean sea states.

FIG. 8 illustrates various types of sea states and their characteristics. For high sea states it can be seen that the period between wave crests increases. This period and the wave height influence how spar buoys of different designs will move vertically. It should be noted that Beaufort wind force numbers from 1 to 6 (which encompass most expected sea state conditions) produce average wave periods from 0.5 to 7.0 seconds.

Figures 9A, 9B:
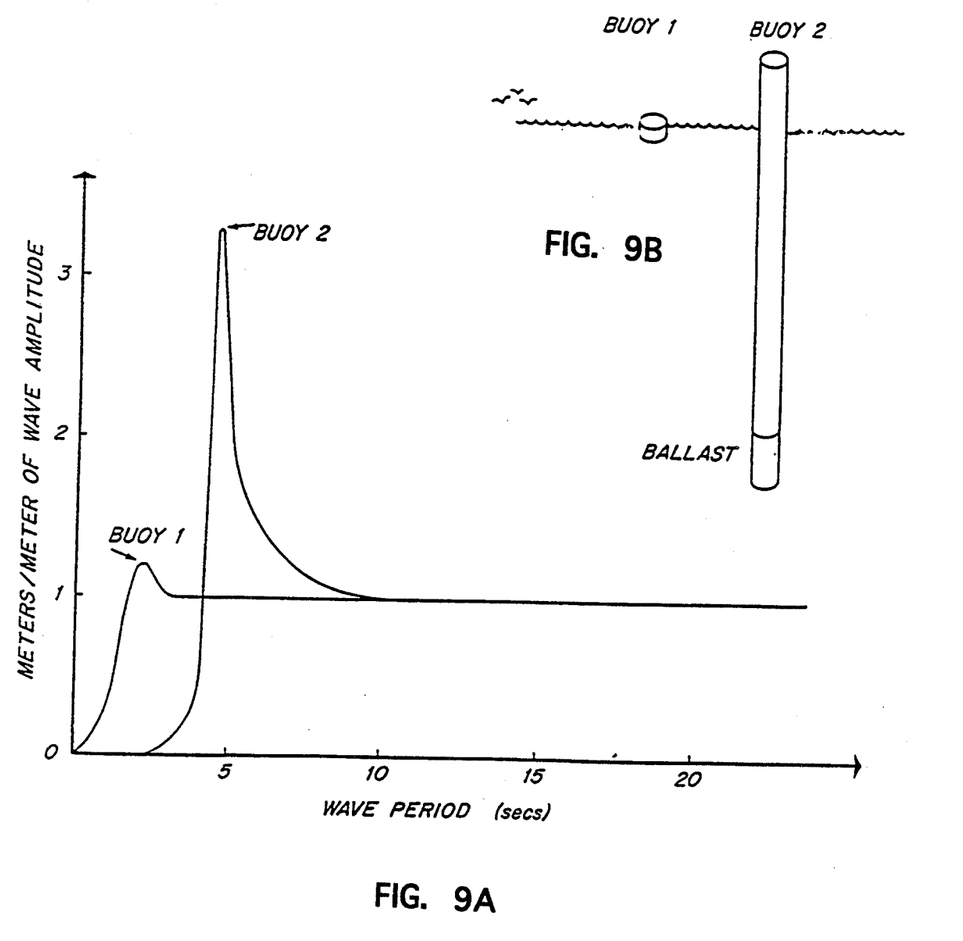
FIGS. 9A and 9B illustrates the comparative motion of different buoy configurations with various wave crest periods.

FIG. 9 illustrates two buoy designs and their respective vertical motions for a range of wave periods. Both are of the same density and diameter, but differ only in length. The vertical scale is calibrated in units of average wave heights. It shows that buoys with different lengths (typical "spar" buoy designs) will produce large vertical movement differences with respect to each other over the range of 0.5 to 7.0 second wave periods. This illustration shows how the central portion (the spar) of the spar buoy can be designed to move 3 times the wave height, or three times the distance that the outer ring moves. A typical size construction for a power buoy could use a spar with a diameter of 1 foot and a length of 9 foot, coupled with an outer buoy ring of 1 foot I.D. and 2 foot O.D. and a height of 8 inches. This difference in relative dimensions would insure a relative movement difference over most wave conditions. This relative movement difference provides the linear, mechanical, bi-directional movement of magnets relative to coils that produces electrical power generation.

FIG. 9 was taken from reference text "Coastal and Oceanic Buoy Engineering", by Henri O. Berteaux (publisher Cable Dynamics & Mooring Systems, Woods Hole, Mass.) which also provides design data to configure other spar buoy designs.

Figure 10A:
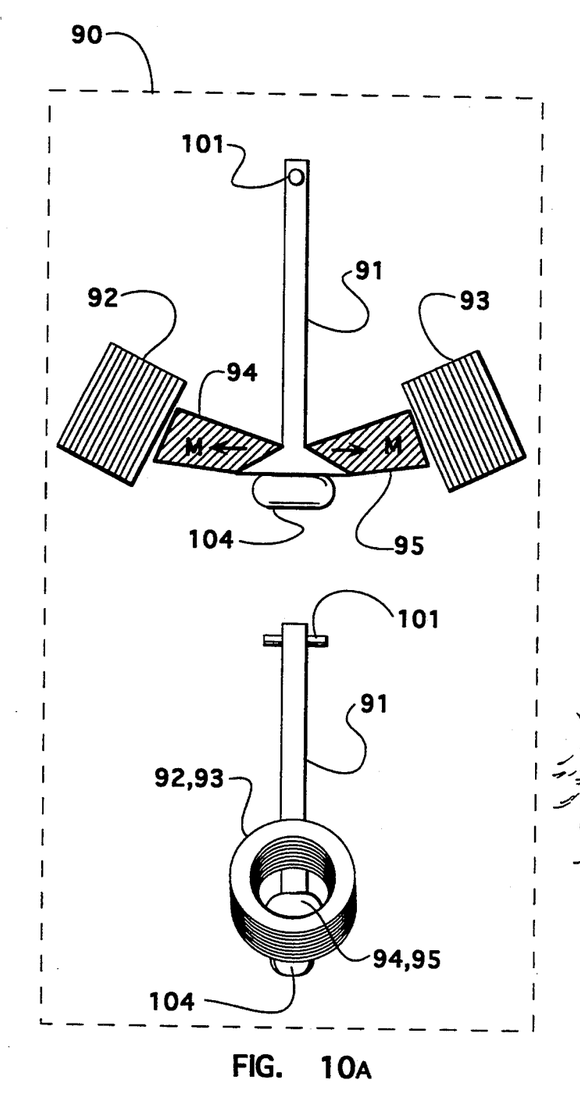
FIG. 10A illustrates a tilt-buoy power generator design.
Figure 10B:
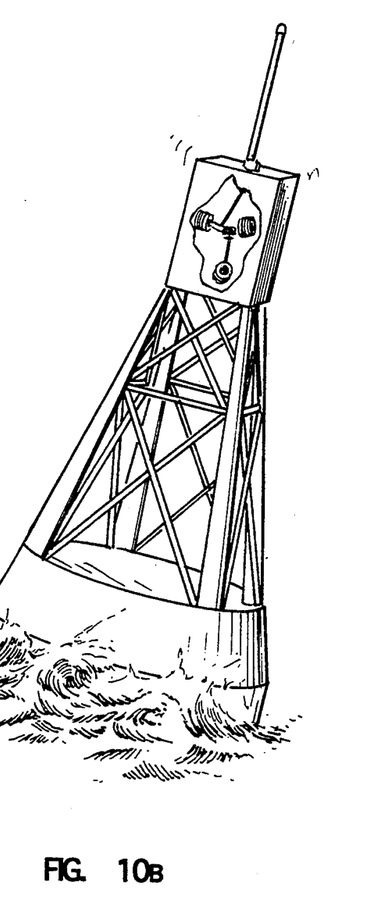
FIG. 10B illustrates a typical tilt-buoy power generator installation.

Buoy power generators can also use the tilt of the wave surface to generate power. FIGS. 10A and 10B show an embodiment which makes use of that tilt to change the flux through two sets of orthogonal coils. This would use a buoy configuration which was essentially a wave-follower design. Buoy 90 is a shallow draft buoy floating on ocean waves.

FIG. 10A shows the inner working parts of a power generator designed for a tilt buoy shown in FIG. 10B. FIG. 10A shows a pendulum arm 91, swinging on hinge 101. Pendulum arm 91 has a ballast weight 104 attached, and also two magnets 94, and 95. Magnets 94 and 95 are free to swing into and out of coils 92 and 93 respectively. A similar lower arrangement, which is positioned under the first, but oriented at ninety degrees to the upper unit. As magnets 94 and 95 move in or out of coils 92 or 93 they will generate voltages in the coils. A tilt in any direction will cause some magnet movement with respect to its respective coil.

The pendulum swing described above could also be accomplished with a hinge point partway up arm 91. With this arrangement, the magnets 94 and 95, and coils 92 and 93 could be mounted at the upper end of arm 91. This arrangement would be useful, for example where all four coils were mounted in the center, and the upper unit used a conventional pendulum, while the lower used this type of hinged arrangement.

Roadway Power Source

For many applications on roadways, electrical power is not easily available, as for example, to power signs or emergency wireless call-box telephones. Currently these applications are managed with batteries or solar-cell arrays. The current application could provide a potentially more cost effective method of supplying that remote power. It uses the "uni-directional force" power generator unit of FIG. 1 and a pneumatic tube across the roadway as shown in FIG. 11.

The "force" power generator model can be used in any orientation where force is applied to the platform 1, as for example where the platform 1 is a piston inside a tube. Other embodiments could also use more or fewer magnets and/or coils.

The prototype unit shown in FIG. 1, could be used as is for this application, but was not of optimum design. For improved power generating efficiency a longer length magnet 7 would be used, which would also have a diameter much closer in size to the inside diameter of the coils 4 and 5. The coils 4 and 5 would also be larger, and of thin wire gauge size. Coil 6 would be much larger, and wrapped tightly around magnet 8.

Figures 11, 11A, 11B:
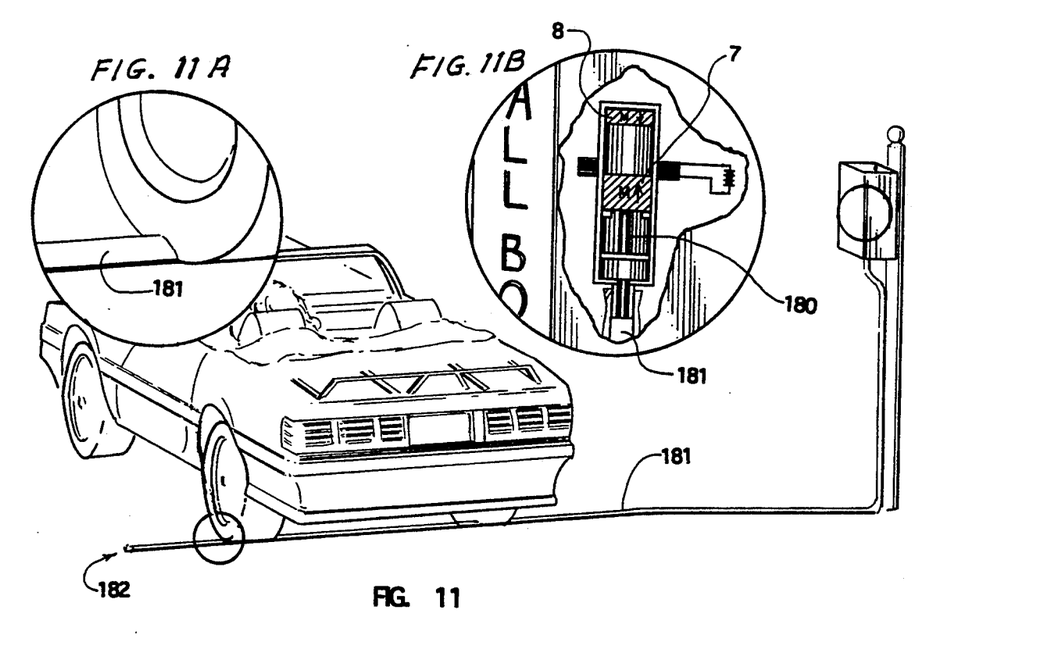
FIGS. 11, 11A and 11B illustrates a roadway power generator embodiment.

FIG. 11 shows an automobile rolling across pneumatic tube 181. Pneumatic tube 181 is simply an air hose with one end sealed with a plug 182, and the other end connected to the uni-directional force power generator. As the automobile tires compress sir tube 181 they cause the pressure to increase in a piston chamber. The piston 180 provides an airtight seal to cylinder 3 and is attached to magnet 7. A surge in air pressure will thus cause piston 180 to move magnet 7 toward magnet 8. This movement will create a voltage in the power coils.

Exercise Radio

For many applications where batteries are used to power small devices mechanical energy is available, for example walkers or joggers using portable radios. For some of these applications use of batteries could be replaced by the devices described in this invention. Such a unit, for example, could be used to power an "exercise-radio", where radio output would only be present when a jogger or walker was active. If the power unit did not receive its required shaking or vibration, its power would decrease, turning off the radio. This would encourage the jogger to keep jogging if he wanted to continue to hear the radio output. Varying the energy storage capacity of the unit would vary the amount of time the radio would play after motion (from exercising) ceased.

Figures 12, 12A:
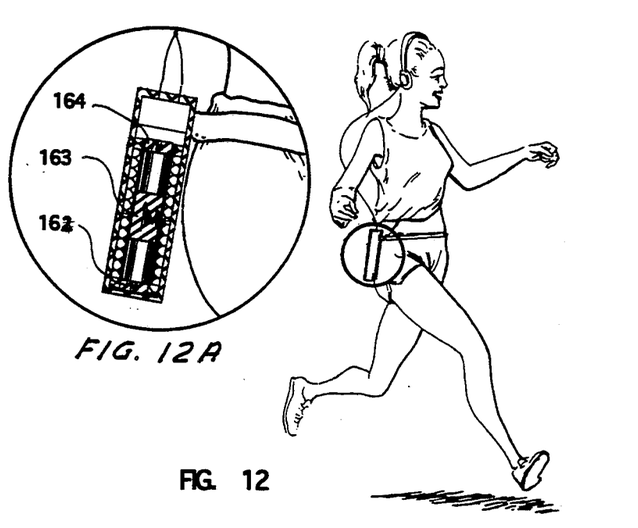
FIGS. 12 and 12A illustrates an exercise radio embodiment.

This preferred application uses the "battery replacement" module and capacitor storage to power a miniature radio. FIG. 12 illustrates this application. The three magnets shown 162, 163, and 164 are arranged in polar opposition as in FIGS. 5A or 13.

This embodiment was tested using the module shown in FIG. 5A and a small portable AM radio. The radio was a small inexpensive radio which used an earphone for sound. It was normally powered by three AAA-size batteries, and had a current drain of about 25 milliamperes. This meant the radio usually had a nominal power drain of about 112 milliwatts. Using the power unit of FIG. 5A set to "battery-replacement" and connected to the radio with clip leads in place of the batteries, the system was tested. The power unit was held in one hand while jogging. Although slightly underpowered, the jogging motion produced sufficient power to run the radio and to hear the music. When jogging motion stopped, the sound immediately stopped also. The combined size of the power unit and the radio used in this test was about 5 cu. inches, and had a combined weight of about 5.0 oz.

In a commercial unit, either a radio with slightly less power requirements, or a slightly more powerful module than the FIG. 5A module would be used. A larger storage capacitor would also be used to provide a longer storage time for the radio.

Another commercial application, similar to the exercise radio would use a similar power unit to power a radio transmitter. In this application, the unit would be attached to a collar, and the collar attached to an animal to be tracked or monitored. When the animal was active, power to the transmitter would be generated. When the animal was sleeping, hibernating, or dead, the signal would not be present. Such a device would not require periodic re-capture of the animal to replace batteries, and could likely be made smaller and lighter than current power means.

Battery Replacement Module

FIG. 13 illustrates how such a battery replacement module would be configured. It would contain the mechanical-to-electrical power converter, a bridge rectifier electrical circuit, an overvoltage protective device, and a small storage capacitor to provide electrical regulation and a capability to handle small power surges.

In FIG. 13 magnets 162, 163, and 164 are aligned so as to be in polar opposition, and spaced such as to keep magnet 163 "floating in gentle equilibrium in the center.

Gentle shaking of the battery replacement unit 159 will cause magnet 163 to move back and forth within cylindrical tube 171. As magnet 163 moves it will create a change in flux in coils 165, 166, 167, and 168. The power generated in each of these coils is brought to an electronics box 169 where bridge rectifiers and voltage regulators adapt the voltages to charge energy storage device 170. This energy storage device 170 could be a capacitor or small re-chargeable battery. For this discussion I will assume a small re-chargeable battery is used as energy storage device 170. This battery both regulates the voltage stored, and helps to provide a surge current supply when power peaks are required. Storage battery 170 is a small rechargeable battery which is kept constantly trickle charged by the power generator. Contacts 160 and 177 are configured to be direct replacement contacts for the batteries they are meant to replace. The contacts are connected to respective contacts on the storage battery 170. For example, negative terminal of battery 170, indicated as 176, would be connected to negative contact 177. The case 159 would be of magnetically permeable material to provide magnetic shielding, but insulated from contact 160. This battery replacement unit would generate power and keep the storage means fully charged as long as sufficient movement of the unit it was housed in occurred.

Referring to the embodiment illustrated in FIG. 5A, actual output values can be examined. Using 50 milliwatts as a nominal continuous power output, the power unit could be compared against equivalent sizes of batteries. A "D-size" nickel-cadmium battery has a volume of about 3.37 cu. inches and a weight of about 5 oz. The power unit in FIG. 5A has approximately the same volume and weight. The battery has a nominal power capacity of about 5,000 milliwatt-hours. The power unit can generate about 50 milliwatt-hours/hour continuously. In 100 hours, or 4 days, it would equal the power output potential of an equivalent size battery. For long time power needs, this invention would provide a smaller, lighter, longer lifetime power source than batteries, when mechanical energy is available.

The "battery replacement" power generator can be used in any orientation and can supply its power through a bridge circuit to a variety of storage devices including capacitors or rechargeable batteries.

Battery Charger Embodiments

Figure 14A:
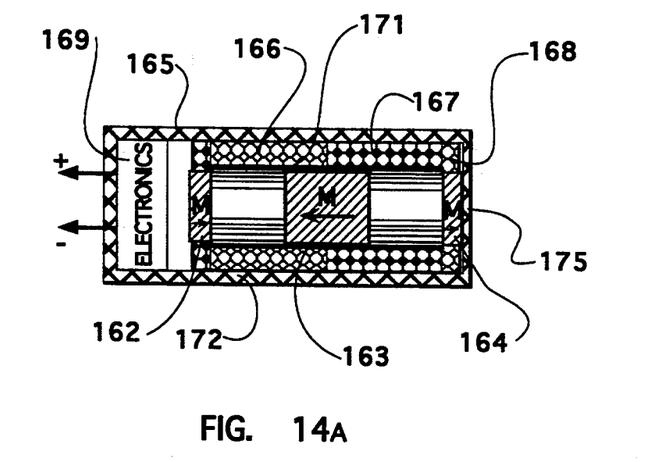
FIG. 14A illustrates a battery charger embodiment.

For some applications the power generator devices could be used to keep re-chargeable batteries in fully charged condition. This embodiment would supply continuous trickle charge to the batteries whenever vibration was present to generate voltages in the coils. Unlike the direct battery replacement unit illustrated in FIG. 13, this embodiment would be used as an external add-on to existing systems. FIG. 14A illustrates a typical embodiment of such a device, although the other power generator designs described above could also be used as the power source. It would generate power which would be connected to existing battery packs, to trickle charge them whenever movement of the unit occurred.

FIG. 14A illustrates a power generator design, similar to that shown in FIG. 13, except that no internal battery is used. Movement of magnet 163 will cause electrical power to be generated in coils 165, 166, 167, and 168.

The embodiment in FIG. 14A also illustrates an outer shell 172 of high permeability material. Such material is obtainable from Bomco, Inc., MµShield Products Division, Malden, Mass. It provides a magnetic shield for the device to both protect against the influence of nearby ferrous metals or magnetic fields, and to shield internal fields from affecting nearby systems. This magnetic shielding option can be used in the previous embodiments as well.

Figure 14B:
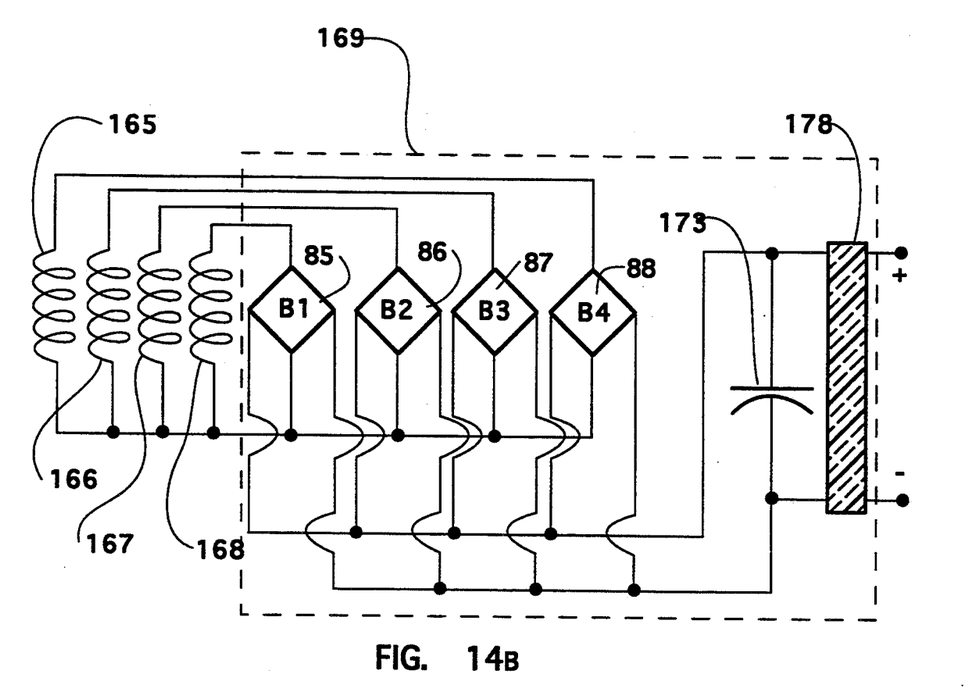
FIG. 14B illustrates electronics sub-system embodiment for the battery charger embodiment.

FIG. 14B illustrates the power coils and electronics portion of box 169. The power coils are brought to an electronics circuit 169 which converts the bipolar voltages into direct current voltage through bridge circuits B1, B2, B3, and B4. This DC voltage is brought to a storage capacitor 173, and optional voltage regulator sub-system 178. The voltage regulator circuit might be added in situations where battery overcharging was critical, or where a fixed voltage was desired. The FIG. 5A module set to "battery-charger was used to test this system. A 3.6 volt nickel cadmium battery with 280 milliampere-hour capacity was used in the test. This battery has a diameter of 1 inch, and a length of 1 inch, which makes it well suited to the size and configuration of the FIG. 5A module. This combination would provide in about 5 cu. inches the peak power capability of the battery, plus the long term power capability of the power generator.

The power generator devices described all generate bipolar electrical signals. To convert this into a direct current voltage for storage on a capacitor or battery can be accomplished by the use of bridge rectifiers connected to each of the coils. The D.C. output from each of these bridge circuits is then brought out to some energy storage device, such as a capacitor or battery.

OTHER VARIATIONS

Persons skilled in the art will recognize many other variations of the present invention, the scope of which is determined by the following claims:

I claim:

1. A linear motion electric power generator for generating electric current from mechanical work done by an intermittent force comprising:
   at least one rare earth magnet defining a magnetic field, said at least one magnetic being contained in a non-ferrous, non-conducting tube,
   at least one coil located within said magnetic field, said at least one magnet and said at least one coil being arranged to permit bi-directional, linear, or approximately linear, motion of said at least one magnet relative to said at least one coil so as to generate an electric current in said at least one coil, and
   a springless orientation means for maintaining a neutral position in the absence of said force, of said at least one magnet relative to said at least one coil, from which said bi-directional, linear, or approximately linear, motion occurs.

2. A generator as in claim 1 wherein said orientation means comprises a magnet located below and in magnetic polar opposition to said at least one rare earth magnet so as to counteract a gravitational force and suspend said rare earth magnet at said neutral position in the absence of said force.

3. A generator as in claim 1 wherein said orientation means comprises at least two orientation magnets each located on opposite sides of said at least one rare earth magnet and in magnetic opposition to said rare earth magnet so as to suspend said rare earth magnet between said at least two orientation magnets in the absence of said force.

4. A generator as in claim 1 and further comprising a source of bi-directional force wherein said source of bi-directional force also comprises said orientation means.

5. A generator as in claim 1 wherein said generator is fabricated in the general shape of a standard battery.

6. A generator as in claim 1 wherein said orientation means comprises a toroidal magnet means located outside said cylindrical tube and ferrous cylinder located inside said cylindrical tube.

7. A generator as in claim 1 and further comprising an electrical energy storage means.

8. A generator as in claim 7 wherein said storage means is a rechargeable battery.

9. A generator as in claim 7 wherein said storage means is a capacitor.

10. A generator as in claim 1 and further comprising a bridge rectifier.

11. A generator as in claim 1 wherein said generator is adapted to provide the power for low power electronics.

12. A generator as in claim 11 wherein said low power electronics is a radio.

13. A generator as in claim 1 and further comprising a magnetic shield means for confining the magnetic field produced by said at least one magnet.

14. A generator as in claim 13 wherein said shield is comprised of high permeability foil.

15. A linear motion electric power generator for generating electric current from mechanical work done by an intermittent force comprising:
   at least one rare earth magnet defining a magnetic field,
   at least one coil located within said magnetic field, said at least one magnetic and said at least one coil being arranged to permit bi-directional, linear, or approximately linear, motion of said at least one magnetic relative to said at least one coil so as to generate an electric current in said at least one coil, and
   a a ferrous ring located outside said tube for maintaining a neutral position in the absence of said force, of said at least one magnet relative to said at least one coil, from which said bi-directional, linear, or approximately linear, motion occurs.

16. A linear motion electric power generator for generating electric current from mechanical work done by an intermittent force comprising:
   at least one rare earth magnet defining a magnetic field,
   at least one coil contained in a non-ferrous, non-conducting tube and located within said magnetic field, said at least one magnet and said at least one coil being arranged to permit bi-directional, linear, or approximately linear, motion of said at least one magnet relative to said at least one coil so as to generate an electric current in said at least one coil, and
   a springless orientation means for maintaining a neutral position in the absence of said force, of said at least one magnet relative to said at least one coil, from which said bi-directional, linear, or approximately linear, motion occurs.

17. A linear motion electric power generator for generating electric current from mechanical work done by an intermittent force comprising:

at least one rare earth magnet defining a magnetic field, at least one coil located within said magnetic field, said at least one magnetic and said at least one coil being arranged to permit bi-directional, linear, or approximately linear, motion of said at least one magnetic relative to said at least one coil so as to generate an electric current in said at least one coil, a springless orientation means for maintaining a neutral position in the absence of said force, of said at least one magnet relative to said at least one coil, from which said bi-directional, linear, or approximately linear, motion occurs, and a first buoy and a second buoy wherein said at least one magnet is located in said first buoy and said at least one coil is located in said second buoy and said buoys are arranged so that when located on a body of water experiencing wave action said first buoy will move relatively to said second buoy.

18. A linear motion electric power generator for generating electric current from mechanical work done by an intermittent force comprising:

at least one rare earth magnet defining a magnetic field, at least one coil located within said magnetic field, said at least one magnetic and said at least one coil being arranged to permit bi-directional, linear, or approximately linear, motion of said at least one magnetic relative to said at least one coil so as to generate an electric current in said at least one coil, and a magnet located below and in magnetic polar opposition to said at least one rare earth magnet so as to counteract a gravitational force and suspend said rare earth magnet at a neutral position, in the absence of said force, from which said bi-directional, linear, or approximately linear, motion occurs.

19. A linear motion electric power generator for generating electric current from mechanical work done by an intermittent force comprising:

at least one rare earth magnet defining a magnetic field, at least one coil located within said magnetic field, said at least one magnet and said at least one coil being arranged to permit bi-directional, linear, or approximately linear, motion of said at least one magnet relative to said at least one coil so as to generate an electric current in said at least one coil, a springless orientation means for maintaining a neutral position in the absence of said force, of said at least one magnet relative to said at least one coil, from which said bi-directional, linear, or approximately linear, motion occurs, a source of bi-directional force wherein said source of bi-directional force also comprises an orientation means and a piston attached to said at least one magnet.

20. A linear motion electric power generator for generating electric current from mechanical work done by an intermittent force comprising:

at least one rare earth magnet defining a magnetic field, at least one coil located within said magnetic field, said at least one magnet and said at least one coil being arranged to permit bi-directional, linear, or approximately linear, motion of said at least one magnet relative to said at least one coil so as to generate an electric current in said at least one coil, and a springless orientation means for maintaining a neutral position in the absence of said force, of said at least one magnet relative to said at least one coil, from which said bi-directional, linear, or approximately linear, motion occurs, wherein said generator is adapted to be worn on the body of a walker of a runner and said force is provided by the body motion of said walker or runner.

21. A linear motion electric power generator for generating electric current from mechanical work done by an intermittent force comprising:

at least one rare earth magnet defining a magnetic field, at least one coil located within said magnetic field, said at least one magnet and said at least one coil being arranged to permit bi-directional, linear, or approximately linear, motion of said at least one magnet relative to said at least one coil so as to generate an electric current in said at least one coil, and a springless orientation means for maintaining a neutral position in the absence of said force, of said at least one magnet relative to said at least one coil, from which said bi-directional, linear, or approximately linear, motion occurs, wherein said generator is adapted to be worn on the body of an animal and said force is provided by the body motion of said animal.

22. A generator as in claim 17 wherein said first buoy is a long cylindrical buoy moving freely within said second buoy which is of toroidal shape and is much smaller in length.

23. A generator as in claim 17 wherein said first buoy is a shallow draft toroidal shaped buoy, and said second buoy is a long cylindrical buoy free to move within said first buoy.

24. A generator as in claim 17 and further comprising an electrical transmitter located in said second buoy.

25. A generator as in claim 4 where gravitational force on a pendulum arm provides said bi-directional force and said orientation means.

26. A generator as in claim 25 wherein two pendulum arms are oriented at ninety degrees to each other so as to provide pendulum movement for any tilt of said generator.

* * * * *